(12) United States Patent
Sabano et al.

(10) Patent No.: US 8,277,129 B2
(45) Date of Patent: Oct. 2, 2012

(54) OPTICAL CONNECTOR WITH REFLECTOR

(75) Inventors: Takahiko Sabano, Chiba (JP); Akito Nishimura, Yotsukaido (JP); Yukio Hayashi, Yotsukaido (JP)

(73) Assignee: Fujikura Ltd., Tokyo (JP)

( * ) Notice: Subject to any disclaimer, the term of this patent is extended or adjusted under 35 U.S.C. 154(b) by 243 days.

(21) Appl. No.: 12/645,141

(22) Filed: Dec. 22, 2009

(65) Prior Publication Data

US 2011/0150399 A1 Jun. 23, 2011

(51) Int. Cl.
*G02B 6/36* (2006.01)
(52) U.S. Cl. .......................................... 385/83
(58) Field of Classification Search ........................ None
See application file for complete search history.

(56) References Cited

U.S. PATENT DOCUMENTS

| | | | |
|---|---|---|---|
| 7,189,007 B2 * | 3/2007 | Imanbayev et al. ............. 385/77 |
| 7,404,679 B2 * | 7/2008 | Ebbutt et al. ................... 385/78 |
| 7,473,038 B2 | 1/2009 | Fujiwara et al. | |
| 7,556,440 B2 * | 7/2009 | Birincioglu et al. ............ 385/93 |
| 7,918,610 B2 * | 4/2011 | Fujiwara et al. ................ 385/88 |
| 2005/0018974 A1 * | 1/2005 | Rolston et al. .................. 385/83 |
| 2006/0177183 A1 * | 8/2006 | Imanbayev et al. ............. 385/89 |
| 2006/0210225 A1 * | 9/2006 | Fujiwara et al. ................ 385/92 |
| 2007/0140628 A1 * | 6/2007 | Ebbutt et al. ................... 385/89 |
| 2009/0252455 A1 | 10/2009 | Ohta et al. | |
| 2011/0091167 A1 * | 4/2011 | Nishimura ...................... 385/88 |
| 2011/0150399 A1 * | 6/2011 | Sabano et al. .................. 385/83 |
| 2011/0150400 A1 * | 6/2011 | Nishimura et al. ............. 385/83 |

* cited by examiner

*Primary Examiner* — Sung Pak
(74) *Attorney, Agent, or Firm* — Sughrue Mion, PLLC

(57) ABSTRACT

Disclosed is an optical connector which terminates an optical fiber inside the optical connector. The optical connector includes a main body. The main body includes: a reflector for reflecting light; a groove portion formed in a top surface of the main body; an optical fiber insertion hole opened in the groove portion, the optical fiber being inserted in the optical fiber insertion hole; an optical fiber placement stage provided in the groove portion, a front end portion of the optical fiber being placed on the optical fiber placement stage. The groove portion includes the optical fiber insertion hole formed at a back inner surface of the groove. The optical fiber placement stage is formed by projecting from the side surface of the groove portion.

14 Claims, 3 Drawing Sheets

OPTICAL CONNECTOR WITH REFLECTOR

BACKGROUND OF THE INVENTION

1. Field of the Invention

The present invention relates to an optical connector configured to terminate an optical fiber, and particularly an optical corrector with a reflector which is configured to reflect light from a terminated optical fiber or light from a light emitting device.

2. Description of the Related Art

An optical connector (also termed as an optical ferrule) with a reflector is used to optically connect an optical fiber to an optical device (such as a light-emitting device or a light-receiving device) on a circuit board with an optical path being altered in order that the optical fiber is laid out almost in parallel with the circuit board. The optical connector is shaped like a cuboid or similar form so that the optical connector is flat with respect to the circuit board. The above mentioned optical connector is placed on the optical device on the circuit board. (refer to U.S. Pat. No. 7,473,038 and US Patent Publication No. 20090252455)

The reflector is formed as part of the optical connector external surface (note that this part may be covered with an adhesive or the like). The optical fiber is inserted to the optical connector from the back surface of the optical connector and is terminated. The front end portion of the optical fiber faces the reflector. The reflector reflects light from the inserted optical fiber toward the undersurface of the optical connector (in other words, almost perpendicularly). In this respect, the undersurface is a surface of the optical connector which faces the optical device when the optical connector is placed on the optical device. The reflected light passes the undersurface of the optical connector, and falls incident onto the light-receiving device on the circuit board. Conversely, light from the light-emitting device placed on the circuit board passes the undersurface, and is thereafter reflected by the reflector, finally falling incident onto the inserted optical fiber.

As described above, the optical fiber is inserted to the optical connector from the back surface of the optical connector. For this reason, when the optical connector is placed on the optical device with the optical fiber being connected to the optical connector, the optical fiber is laid out almost in parallel with the circuit board.

SUMMARY OF THE INVENTION

The present invention is to provide an optical connector with a reflector which is capable of suppressing transmission loss between optical fiber, which is terminated in the optical connector, and an optical device.

An aspect of the present invention is an optical connector which terminates an optical fiber inside the optical connector, comprising a main body molded from an optically transparent resin; the main body including a reflector configured to perform at least one of the reflecting of light from the optical fiber to an undersurface of the main body and the reflecting of light incident onto the undersurface of the main body to the optical fiber, a groove portion formed in a top surface of the main body; an optical fiber insertion hole formed to extend from a back surface of the main body to the groove portion, the optical fiber insertion hole being opened in the groove portion, the optical fiber being inserted in the optical fiber inserting hole; and an optical fiber placement stage provided inside the groove portion, a front end portion of the optical fiber being placed on the optical fiber placement stage; wherein the groove portion includes a side surface formed to face the optical fiber insertion hole, and the optical fiber placement stage is formed so as to project from the side surface of the groove portion.

A top surface of the optical fiber placement stage is preferably positioned in a plane tangent to an inner surface of the optical fiber insertion hole.

The optical fiber placement stage may comprise a guide part configured to position the optical fiber to the top surface of the optical fiber placement stage.

The guide part may comprise a U-shaped groove extending in a depth direction of the optical fiber insertion hole.

The reflector may comprise a flat surface inclined with respect to the depth direction of the optical fiber insertion hole.

The reflector preferably has a concave surface when viewed from the optical fiber insertion hole.

The main body further may comprise a lens part provided to the undersurface of the main body.

In the foregoing optical connector, the optical fiber is inserted to the optical fiber insertion hole, and is placed on the optical fiber placement stage in the groove portion. This makes it possible to appropriately position the optical fiber to the reflector. In addition, even when stress is applied on the inserted optical fiber due to shrinkage of the adhesive which has been filled in the groove portion, the optical fiber placement stage is capable of preventing the optical fiber from bending due to this stress.

DETAILED DESCRIPTION OF THE PREFERRED EMBODIMENTS

Descriptions will be provided for an embodiment of the present invention.

An optical connector according to this embodiment terminates at least one optical fiber in the optical connector. At least one optical fiber includes a plurality of optical fibers, which may constitute an optical fiber ribbon, or those which are mutually independent. In the following descriptions, an optical fiber, which is obtained by removing the outer sheath (jacket) therefrom, is termed as a "bare optical fiber" for convenience sake. In other words, the bare optical fiber is optical fiber comprises only a core and a cladding. In addition, an optical device means: a light-emitting device such as a laser diode; a light-receiving device such as a photo diode; or a hybrid device including a light-emitting device and a light-receiving device.

Figure 1:
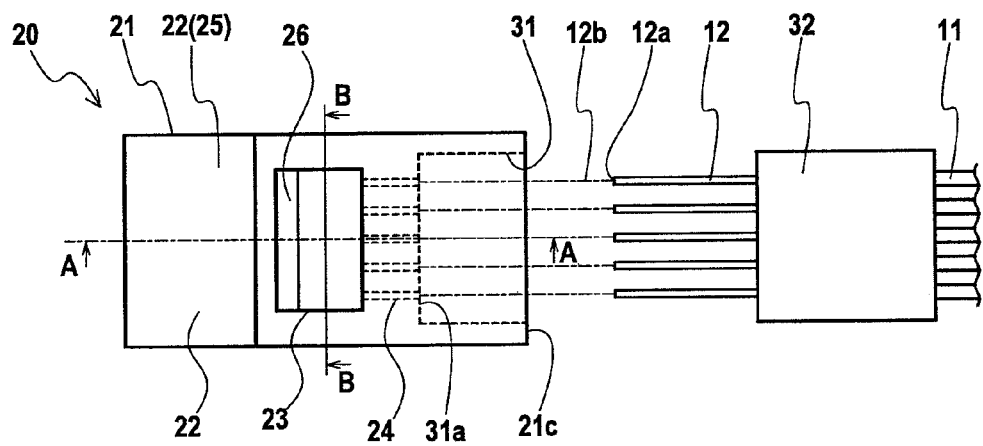
FIG. 1 is a plan view showing an optical connector according to an embodiment of the present invention.
Figure 2:
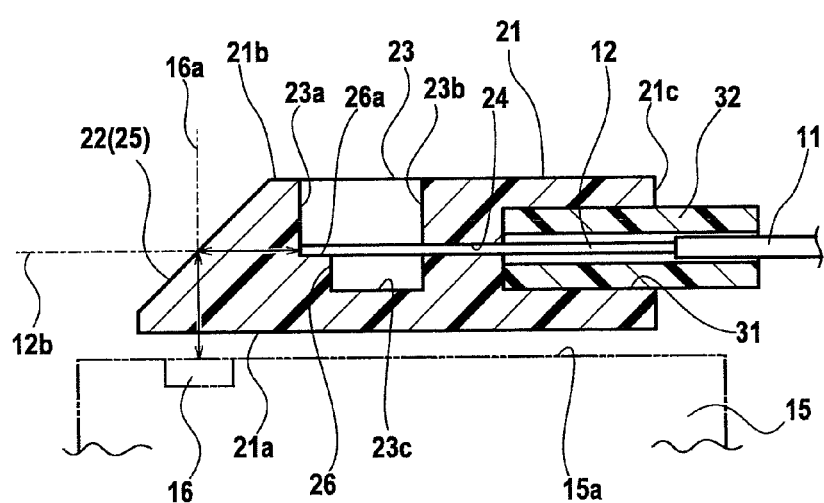
FIG. 2 is a cross-sectional view of the optical connector taken along the A-A line of FIG. 1, and shows the look of optical connector shown in FIG. 1 after an optical fiber is inserted to the optical connector.
Figure 3:
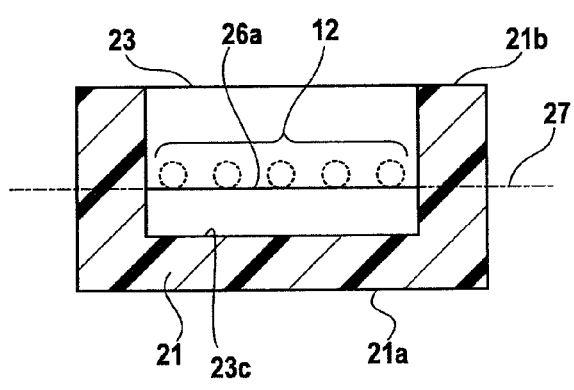
FIG. 3 is a cross-sectional view of the optical connector taken along the B-B line of FIG. 1, and shows the look of optical connector shown in FIG. 1 after the optical fiber is inserted to the optical connector.

FIG. 1 is a plan view showing the optical connector (optical ferrule) according to the embodiment of the present invention. FIG. 2 is a cross-sectional view of the optical connector taken along the A-A line of FIG. 1, and FIG. 3 is a cross-sectional view of the optical connector taken along the B-B line of FIG. 1. FIGS. 2 and 3 each show how the optical connector 20 shown in FIG. 1 looks after an optical fiber 11 is inserted in the optical connector.

As shown in FIGS. 1 and 2, a main body 21 of the optical connector 20 is shaped like a flat cuboid or a similar form. The optical fiber 11 (bare optical fiber 12) is inserted in the main body 21 from the back surface 21c of the main body 21 toward the front (in other words, leftward in FIG. 1). The optical fiber 11, together with a boot 32, may be inserted in the main body 21.

The main body 21 is mounted on the top surface 15a of a holder 15 which is attached to a circuit board (not illustrated) or the like. When the main body 21 is mounted on the top surface 15a of the holder 15, an undersurface 21a of the main body 21 faces a light-emitting surface or a light-receiving surface of an optical device 16. The optical fiber 11 is laid out almost in parallel with the circuit board and the like.

The material for the main body 21 is a resin. This resin is optically transparent. In this respect, the optical transparency means that transmission loss at the optical wavelength region in use is small enough not to cause a practical problem. The optical transparency is not limited to a quality in which the resin is visually transparent. It is desirable that the resin should be polycarbonate, denatured polyolefin, epoxy resin and the like. The main body 21 is produced by resin molding methods such as injection molding.

As shown in FIG. 1, the main body 21 includes a reflector 25. As shown in FIG. 2, the reflector 25 is formed in the front surface 22 of the main body 21. The front surface 22 is inclined surface, for instance. In this case, the front surface 22 inclines in a way that the front surface becomes closer to the back surface 21c, toward the top surface 21b of the main body 21 from the undersurface 21a of the main body 21. No specific restriction is imposed on an inclination angle of the front surface 22 to the undersurface 21a of the main body 21. Nevertheless, from a viewpoint of the manufacturing process (for example, cost for manufacturing dies), it is advantageous that the front surface 22 should be formed in a way that the inclination angle of the front surface 22 coincides with an inclination angle of the reflector 25 (which will be described later) to the undersurface 21a of the main body 21 (see FIG. 2). Furthermore, when a plurality of optical fibers 11 is provided, the front surface 22 is formed in a way that the front surface 22 extends in a direction in which the optical fibers 11 are arrayed (in other words, perpendicularly to FIG. 1), and a width of the front surface 22 is equal to or wider than a width in which the optical fibers 11 are arrayed.

The front surface 22 includes the reflector 25. The reflector 25 reflects propagating-light in the main body 21, on the basis of the difference in refractive index between the material of the main body 21 and air outside the main body 21 (such reflection is commonly called "internal reflection"). Specifically, when the optical device 16 is a light-receiving device, the reflector 25 reflects light, which comes from the inserted bare optical fiber 12, to a light receiving device through the undersurface 21a of the main body 21. When the optical device 16 is a light-emitting device, the reflector 25 reflects light to from the emitting device through the undersurface 21a of the main body 21, to the bare optical fiber 12. When the optical device 16 is a hybrid device configured to emit and receive light, the reflector 25 performs the two reflections as described above. In general, the higher a reflection efficiency of the reflector 25 is, the better it is. With this taken into consideration, the front surface 22 may be provided with a resin or the like which satisfies an appropriate difference in refractive index between the reflector 25 and the material for the main body 21.

As shown in FIG. 2, the reflector 25 has a flat surface inclined with respect to the depth direction of an optical fiber insertion hole 24, for instance. Note that, as described later, the reflector 25 may have curved surface (see FIGS. 8 and 9). When the reflector 25 has a flat surface, the inclination angle of the reflector 25 to the undersurface 21a of the main body 21 is set at a value which secures a specular reflection between the optical device 16 and the bare optical fiber 12. For this reason, this inclination angle depends on: a crossing angle between an optical axis 16a of the optical device 16 and an optical axis 12b of the bare optical fiber 12; and an angle of the optical axis 16a (or the optical axis 12b) to the undersurface 21a of the main body 21. For instance, as shown in FIG. 2, when the optical axis 16a is orthogonal to the optical axis 12b and the optical axis 16a is perpendicular to the undersurface 21a of the main body 21, the inclination angle of the reflector 25 is 45 degrees.

The main body 21 includes a groove portion (recess portion) 23. The groove portion 23 is formed in the top surface 21b of the main body 21, and is positioned between the front surface 22 (or the reflector 25) and the back surface 21c of the main body 21. When a plurality of optical fibers 11 is arrayed, the groove portion 23 is formed so as to extend in the direction in which the optical fibers 11 are arrayed (in other words, perpendicularly to FIG. 1). The groove portion 23 includes two side surfaces 23a, 23b which face each other in the depth direction of the optical fiber insertion hole 24.

The side surface (front inner surface) 23a is positioned closer to the front surface 22. An end surface 12a of the bare optical fiber 12 faces the side surface 23a in a way that the end surface 12a thereof is in close proximity to, or in contact with, the side surface 23a. In this case, it is most desirable that the end surface 12a should be in contact with the side surface 23a. On the other hand, the side surface (back inner surface) 23b is positioned closer to the back surface 21c of the main body 21.

The main body 21 includes the optical fiber insertion hole 24. The optical fiber insertion hole 24 is formed by creating holes from the bottom surface 31a of the boot insertion area 31 to the side surface 23b. The bare optical fiber 12, which is exposed as a result of removing the coating from the optical fiber 11, is inserted in the optical fiber insertion hole 24 frontward. Note that the end surface 12a of the bare optical fiber 12 is formed in a way that the end surface 12a is perpendicular to the optical axis 12b of the bare optical fiber 12. When the bare optical fiber 12 is inserted in the optical fiber insertion hole 24, a gas having remaining in the optical fiber insertion hole 24 is discharged from this hole. This makes it easy to insert the bare optical fiber 12.

In the groove portion 23, an optical fiber placement stage 26 is provided. The optical fiber placement stage 26 is formed so as to project from the side surface 23a of the groove portion 23 in the depth direction of the optical fiber insertion hole 24. The optical fiber placement stage 26 is formed to be integrated into the main body 21. Otherwise, the optical fiber placement stage 26 may be formed so as to project from a bottom surface 23c of the groove portion 23. In this case, the top surface 26a of the optical fiber placement stage 26 is integrally connected with the side surface 23a of the groove portion 23.

The top surface 26a of the optical fiber placement stage 26 is in parallel with the depth direction of the optical fiber insertion hole 24 and the left-right direction of the main body 21 (i.e. a vertical direction to FIG. 1). It is desirable that the distance between the optical fiber placement stage 26 and the side surface 23b should be set equal to or longer than a die design value in consideration of a load applied to a die during resin molding. Note that a corner of the top surface 26a which is closer to the side surface 23b may be chamfered off for easy insertion of the bare optical fiber 12 toward the side surface 23a. The chamfered corner prevents bending of the bare optical fiber 12 or damage on the end surface 12a which would otherwise occur when the bare optical fiber 12 abuts on the optical fiber placement stage 26.

As shown in FIG. 3, the bare optical fiber 12, which is exposed in the groove portion 23, is placed on the top surface 26a of the optical fiber placement stage 26. The optical fiber placement stage 26 prevents the bare optical fiber 12 from excessive bending due to the gravity or the intrinsic elasticity of the bare optical fiber 12.

Figure 4:
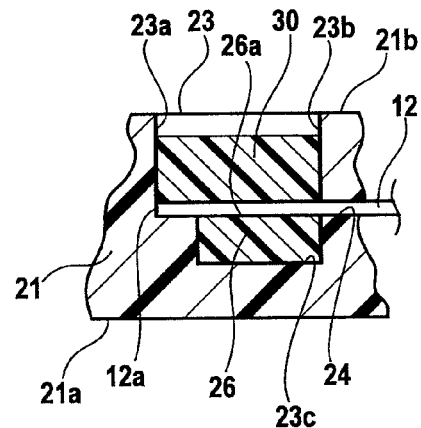
FIG. 4 is a diagram showing a main portion of the optical connector taken along the A-A line of FIG. 1, and shows how the main portion thereof look, after an adhesive is filled.

An adhesive 30 is filled in the groove portion 23 with the bare optical fiber 12 being inserted (see FIG. 4). It is preferable that the adhesive 30 should be optically transparent. Particularly, it is desirable that the refractive index of the adhesive 30 should be equal to the core (not illustrated) of the bare optical fiber 12. When an interstice intervenes between the end surface 12a and the side surface 23a, a portion of the adhesive 30, which is filled in this interstice, can exert a function as a refractive index matching agent, and accordingly can suppresses the transmission loss.

The adhesive 30 may shrink while the adhesive hardens. Once the adhesive 30 shrinks, it is likely that stress may be placed on the bare optical fiber 12 in the direction toward the undersurface 21a of the main body 21; and the bare optical fiber 12 may accordingly bend toward the undersurface 21a. However, the optical fiber placement stage 26 can support the bare optical fiber 12 from under. For this reason, the optical fiber placement stage 26 prevents bending of the bare optical fiber 12 which occurs while the adhesive 30 hardens.

Because the optical fiber placement stage 26 prevents bending of the bare optical fiber 12 as described above, it is possible to appropriately position the bare optical fiber 12 to the side surface 23a and the reflector 25.

Figure 5:
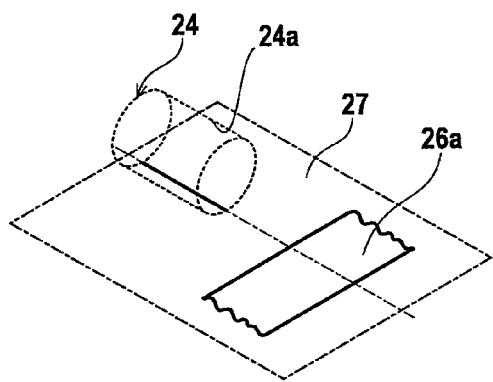
FIG. 5 is a schematic diagram showing a positional relationship between an optical fiber insertion hole and an optical fiber placement stage according to the embodiment of the present invention.

As shown in FIG. 5, it is desirable that the top surface 26a of the optical fiber placement stage 26 should be positioned in an imaginary plane (tangent plane) 27 which is imagined to be tangent to the inner surface 24a of the optical fiber insertion hole 24. In other words, it is desirable that, if the optical fiber insertion hole 24 is imaginarily extended to the optical fiber placement stage 26, an imaginary extension of the inner surface 24a should be tangent to the top surface 26a of the optical fiber placement stage 26. Note that the definition of "the top surface 26a is positioned in the plane 27" means that a portion of the inner surface 24a of the optical fiber insertion hole 24, which is the closest to the undersurface 21a of the main body 21, is positioned virtually at the same height as the top surface 26a of the optical fiber placement stage 26 to an extent that the height does not affect the transmission loss in the optical connector.

The foregoing configuration causes the bare optical fiber 12 to be positioned on the plane 27, after the bare optical fiber 12 is inserted to the optical fiber insertion hole 24 and placed on the top surface 26a of the optical fiber placement stage 26. Accordingly, the foregoing configuration can prevent the above-mentioned bending more effectively.

Figure 6:
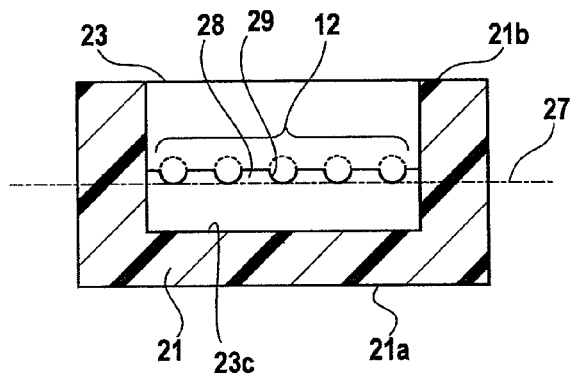
FIG. 6 is a cross-sectional view showing a guide part according to the embodiment of the present invention.

As shown in FIG. 6, the optical fiber placement stage 26 may include a guide part (optical fiber guiding part 23b) configured to position the bare optical fiber 12 to the top surface 26a. When a plurality of multiple optical fibers 11 is provided, the guide part 28 is provided to each optical fiber 11. The guide part 28 may be provided on the whole of the top surface 26a, or may be provided on a part of the top surface 26a.

The guide part 28 includes, for instance, a groove 29 which extends in the depth direction (along the axis) of the optical fiber insertion hole 24. Accordingly, the groove 29 is formed to have a U-shaped cross section. The cross section has a curvature which is equal to or more than the radius of the bare optical fiber 12. The depth of the groove 29 is equal to or less than the radius of the bare optical fiber 12. It is desirable that the inner surface of the groove 29 should be tangent to the plane 27 as described above.

While the bare optical fiber 12 is being inserted in the optical fiber insertion hole 24 to the groove 23, the bare optical fiber 12 slides in the depth direction of the optical fiber insertion hole 24 and guided by the groove 29. At this moment, the groove 29 restrains the bare optical fiber 12 from moving in a direction other than the depth direction. Accordingly, it is possible to position the bare optical fiber 12 to the side surface 23a and the reflector 25 appropriately.

As described above, the optical fiber insertion hole 24 is formed to extend from the back surface 21c of the main body 21 to the groove portion 23, and is opened in the groove portion 23. As shown in FIG. 2, the depth direction of the optical fiber insertion hole 24 may be in parallel with the undersurface 21a of the main body 21. Otherwise it may be inclined. When the depth direction is inclined with respect to the undersurface 21a of the main body 21, the top surface 26a and the guide part 28 (the groove 29) of the optical fiber placement stage 26 are inclined according to the inclination of the depth direction. Note that the diameter of the optical fiber insertion hole 24 is larger than that of the bare optical fiber 12.

The main body 21 may include a boot insertion area 31 in which a boot 32 configured to protect the optical fiber 11 and the bare optical fiber 12 is inserted. When the main body 21 includes the boot insertion area 31, the optical fiber insertion hole 24 is opened in a bottom surface 31a of the boot insertion area 31. The boot insertion area 31 is a rectangular hole which is opened in the back surface 21c of the main body 21. The opening area of this hole is larger than that of the optical fiber insertion hole 24. Also the length of this hole sides are longer than the length of the boot sides. Having said so, the shape of the boot is identical with the rectangular hole. A through-hole 34 in which to insert the optical fiber 11 is formed in the boot 32. The optical fiber 11 with the bare optical fiber 12 being exposed is inserted through the boot 32. Thereafter, the optical fiber 11, together with the boot 32, is inserted in the boot insertion area 31. The bare optical fiber 12 is inserted in the optical fiber insertion hole 24. Furthermore, the boot 32 is fixed to the inside of the boot insertion area 31 by use of an adhesive.

Figure 7:
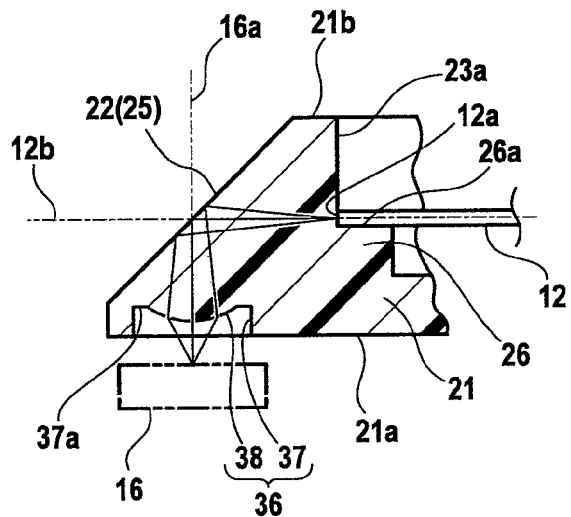
FIG. 7 is a cross-sectional view showing a lens part according to the embodiment of the present invention.

As shown in FIG. 7, the main body 21 may have a lens part 36 in its undersurface 21a. The lens part 36 includes: a groove portion 37 formed in the undersurface 21a; and a lens 38 provided in a bottom surface 37a of the groove portion 37. When a plurality of optical fibers 11 is provided, the lens part 36 is provided to each optical fiber 11, and the lenses 38 are arrayed in the direction in which the optical fibers 11 are arrayed. Nevertheless, the groove portions 37 may be formed to communicate with one another. In other words, the grooves 37 may be formed to share a single rectangular opening in the undersurface 21a of the main body 21.

The lens 38 is a convex lens with the lens surface protruding out. The lens 38 focuses the light, which is reflected off the reflector 25, on the optical device 16. Alternatively, the lens 38 focuses light from the optical device 16 on the reflector 25. The lens 38 is formed to be integrated with the main body 21. The lens 38 may be formed separately from the main body 21, and thereafter it is fixed to the main body 21.

It is desirable that a dimension, with which the lens 38 projects from the bottom surface 37a, should be less than the depth of the groove portion 37.

Figure 8:
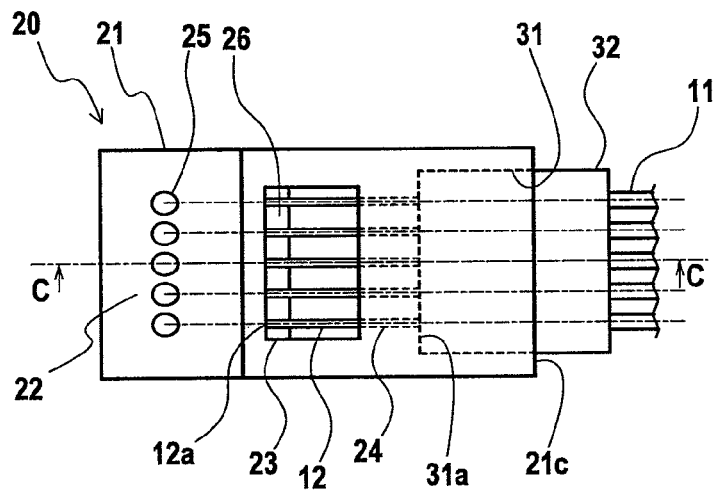
FIG. 8 is a plan view showing an optical connector according to the embodiment of the present invention.
Figure 9:
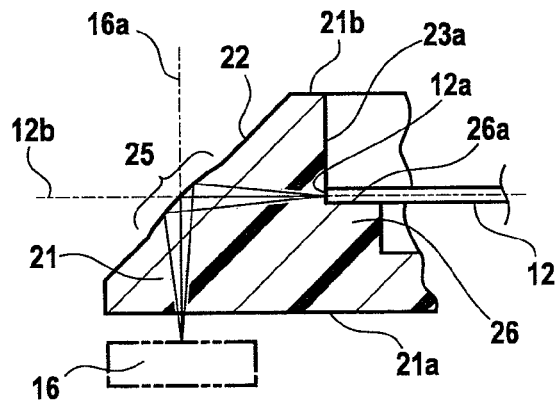
FIG. 9 is a diagram showing a main portion of the optical connector taken along the C-C line of FIG. 8.

As shown in FIGS. 8 and 9, the reflector 25 may be a curved surface. The curved surface is, for instance, a spherical surface or an aspherical surface. The curved surface is shaped concavely when viewed from the optical fiber insertion hole 24. That is to say, the reflector 25 functions as a concave mirror for light which has passed the main body 21. When a plurality of optical fibers 11 is provided, the reflector 25 is provided to each optical fiber 11 (see FIG. 8). It is desirable that the curved surface should be formed in a way that the focal point of the curved surface is located at both end surface 12a of the bare optical fiber 12 and any one of the light-emitting surface or the light-receiving surface of the optical device 16. For instance, it is desirable that the curved surface should be formed in a way that the tangent plane of the curved surface performs specular reflection between the bare optical fiber 12 and the optical device 16. This configuration causes the reflector 25 to converge light which goes out from the bare optical fiber 12 and the optical device 16. Accordingly, this configuration can suppress the transmission loss. Furthermore, this configuration enables light with a desired intensity to be transmitted even when the end surface 12a of the bare optical fiber 12 or the optical device 16 slightly deviates from the focal length which is defined by the reflector 25.

What is claimed is:

1. An optical connector ferrule, comprising:
   a main body molded from an optically transparent resin, the main body comprising:
      an optical fiber insertion hole having a bottom, the optical fiber insertion hole running from a back end portion of the main body
      an adhesive filling recess portion formed on a top surface of the main body, the adhesive filling recess portion configured to secure a front end portion of the optical fiber disposed therein, the adhesive filling recess portion comprising a front inner surface, a back inner surface and a bottom surface, the front inner surface including the bottom surface of the optical fiber insertion hole;
      a reflector configured to internally reflect the light path incoming from a tip portion of the optical fiber to a light receiving device through an undersurface of the main body and/or internally reflect light form a light emitting device through the undersurface of the main body to the tip portion of the optical fiber, and
      an optical fiber placement stage projected from a bottom surface of the adhesive filling recess portion, the optical fiber placement stage integrally connected to the front inner surface of the adhesive filling recess portion and, separated from the back inner surface of the adhesive filling recess portion, the optical fiber placement stage configured to place the optical fiber portion disposed in the adhesive filling recess portion.

2. The optical connector ferrule according to claim 1, wherein a top surface of the optical fiber placement stage is positioned in a plane tangent to a longitudinal direction of the optical fiber insertion hole.

3. The optical connector ferrule according to claim 2, wherein an optical guiding part is formed on the top surface of the optical fiber placement stage.

4. The optical connector ferrule according to claim 3, wherein the optical fiber guiding part comprises a U-shaped groove extending along the longitudinal direction of the optical fiber insertion hole.

5. The optical connector ferrule according to claim 1, wherein the reflector surface is inclined with respect to the longitudinal direction of the optical fiber insertion hole.

6. The optical connector ferrule according to claim 1, wherein the reflector surface is a concave one when viewed from the optical fiber insertion hole.

7. The optical connector ferrule according to claim 1, wherein the main body further comprises a lens part formed on the undersurface of the main body.

8. An optical connector comprising:
   a main body molded from an optically transparent resin; and
   an optical fiber fixed inside the connector;
   the main body comprising:
      an optical fiber insertion hole having a bottom, the optical fiber insertion hold running from a back end portion of the main body
      an adhesive filling recess portion formed on a top surface of the main body, the adhesive filling recess portion configured to secure a front end portion of the optical fiber disposed therein, the adhesive filling recess portion comprising a front inner surface, a back inner surface and a bottom surface, the front inner surface including the bottom surface of the optical fiber insertion hole;
      a reflector configured to internally reflect the light path incoming from a tip portion of the optical fiber to a light receiving device through an undersurface of the main body and/or internally reflect light from a light emitting device through the undersurface of the main body to the tip portion of the optical fiber; and
      an optical fiber placement state projected from a bottom surface of the adhesive filling recess portion, the optical fiber placement stage integrally connected to the front inner surface of the adhesive filling recess portion and, separated from the back inner surface of the adhesive filling recess portion, the optical fiber placement stage configured to place the optical fiber portion disposed in the adhesive filling recess portion.

9. The optical connector according to claim 8, wherein a top surface of the optical fiber placement stage is positioned in a plane tangent to a longitudinal direction of the optical fiber insertion hole.

10. The optical connector according to claim 9, wherein an optical fiber guiding part is formed on the top surface of the optical fiber placement stage.

11. The optical connected according to clam 10, wherein the optical fiber guiding part comprises a U-shaped groove extending along the longitudinal direction of the optical fiber insertion hole.

12. The optical connector according to claim 8, wherein the reflector surface is inclined with respect to the longitudinal direction of the optical fiber insertion hole.

13. The optical connector according to claim 8, wherein the reflector surface is a concave one when viewed from the optical fiber insertion hole.

14. The optical connector according to claim 8, wherein the main body further comprises a lens part formed on the undersurface of the main body.

* * * * *